Aug. 18, 1964  R. C. MORGAN  3,145,052
AIRPLANE SEATS

Filed Jan. 24, 1963  7 Sheets-Sheet 1

Fig.1.

Inventor
Robert Charles Morgan

By
Bailey, Stephens + Huettig
Attorneys

Aug. 18, 1964   R. C. MORGAN   3,145,052
AIRPLANE SEATS

Filed Jan. 24, 1963   7 Sheets-Sheet 3

Inventor
Robert Charles Morgan

By
Bailey, Stephens & Huettig
Attorneys

Aug. 18, 1964

R. C. MORGAN

3,145,052

AIRPLANE SEATS

Filed Jan. 24, 1963

Inventor
Robert Charles Morgan

By
Bailey, Stephens & Huettig
Attorneys

United States Patent Office 3,145,052
Patented Aug. 18, 1964

3,145,052
AIRPLANE SEATS
Robert Charles Morgan, Maidenhead, England, assignor to British European Airways Corporation, Ruislip, England
Filed Jan. 24, 1963, Ser. No. 253,723
8 Claims. (Cl. 297—354)

This invention relates to reclining seats, that is to say, seats which can be varied in inclination, of the kind used in airplanes.

It is customary in passenger airplanes to provide seats of different width and therefore of different degrees of comfort in accordance with the fare paid, and in particular to allocate a given amount of floor space to either two seats or three seats for passengers with respectively, first-class and "economy" tickets. A problem that faces the operator of an airline is to divide the total space appropriately so that the numbers of the two kinds of seat will equal the demand for each. An airplane should be available to fly on any route at short notice, but the demand on one route may be wholly different from that on another, and it may even vary on the same route at different times of the day. It is therefore highly desirable to provide seat constructions such that conversion from the one kind of seat to the other can be effected rapidly and simply without removing or supplying any seats or parts. It is also necessary to make provision for connecting and disconnecting the recline mechanism according to the number of seats in use.

It often happens that the width of an airplane is sufficient to allow for six narrower seats in a row, arranged in two groups of three with a central aisle between them. In such a case it is desirable to convert each group into two wider seats. On the other hand, in some airplanes there is room only for four or five narrower seats in a row, arranged in two groups of two or in one group of two and one group of three, in either case with an aisle between the groups. In this case it is desirable to convert such a group of two narrower seats into one wider seat. For comfort it is desirable that the seats themselves should be of the bench type with a single seat squab extending along the structure between the outer arm rests.

An important object of this invention is to provide a seat construction wide enough to form at least one wider seat and at least two narrower seats that is capable of easy and rapid conversion from the wider to the narrower form and vice versa.

Broadly this object is achieved by making the seat back in sections capable of independent movement about horizontal axes and providing means for interlocking adjacent sections into a combined section so that they move together or unlocking them so that they can move independently of one another.

When there are three narrower seats convertible to two wider ones the minimum number of back sections is four, though in some constructions according to the invention there may be more than four back sections. If, as is well preferred, there are also one or more centre arm rests where either two or three seats are provided, then these arm rests may be readily removable. If, however, the number of back sections is greater than the minimum, then some of these back sections may hinge downwards to form the centre arm rest or rests.

Passenger seats in aircraft commonly carry tables in their backs. In seat constructions according to the invention there may be three tables, the middle one being made in two equal parts which can be taken apart and each fixed to one of the outer tables in the two-seat setting.

The invention will be more fully understood from the following description, taken in conjunction with the annexed drawings, in which.

Figure 1:
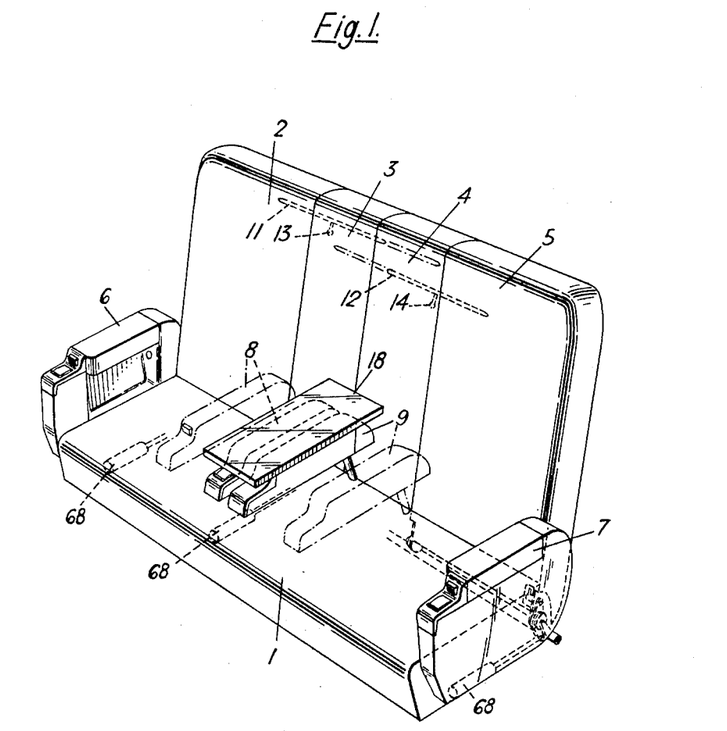
FIGURE 1 is a perspective view of a seat that can be arranged as either two wider or three narrower individual seats.
Figure 2:
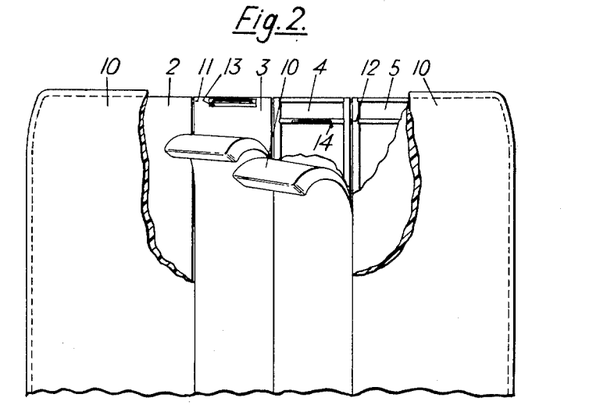
FIGURE 2 is a view of part of the back of the seat.
Figure 3:
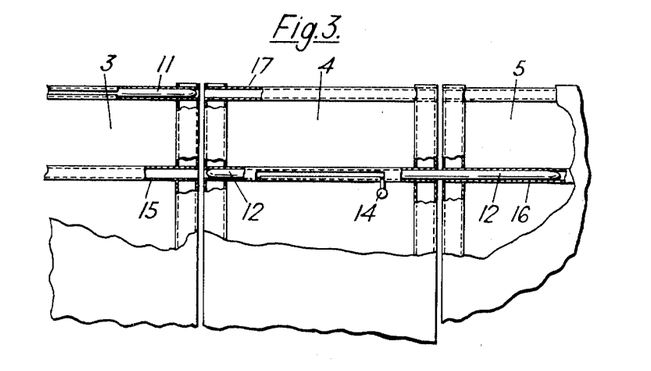
FIGURE 3 is an enlarged view showing the arrangement of the bolts.

Referring first to FIGURES 1 to 3, the seat comprises a single squab 1, a back made in four separate sections 2, 3, 4 and 5, two end arms 6 and 7 and two centre arms 8 and 9. The framework and legs of the seat are made of welded tubing which is not shown in the interests of clarity. The framework of the back sections is filled in with sheet metal which acts as a backing to cushions 10. A transverse tube runs the full width of the seat at the rear and serves as an axis about which all four back sections can pivot. The two inner sections 3 and 4 are each approximately half the width of the two outer sections 2 and 5 and in the three-seat conversion the sections 3 and 4 are bolted together and are freed from the sections 2 and 5. The backs of the three seats are thus formed by the section 2, sections 3 and 4 combined together and the section 5, the reclining angle of each back being independently adjustable. In the two-seat conversion the sections 3 and 4 are freed from each other and the sections 2 and 3 are bolted together to form the back of one seat and the sections 4 and 5 are similarly bolted together to form the back of the other seat.

The bolting is accomplished by two long-travel double-ended bolts 11 and 12 having handles 13 and 14 respectively. The bolt 11 is mounted on the section 3 and the bolt 12 on the section 4. Referring to FIGURE 3, the section 3 carries a socket 15 for the reception of one end of the bolt 12 and the section 5 carries a socket 16 for the reception of the other end of this bolt, whilst the section 4 carries a socket 17 for the reception of one end of the bolt 11. The other end of this bolt is received in a socket carried on the section 2, which is not shown in FIGURE 3. Looking towards the drawings, i.e. facing the imaginary passengers, for the two-seat conversion the bolt 11 is slid to the left and the bolt 12 is slid to the right, as shown. Thus the bolt 11 will join the sections 2 and 3 together to form the back of one seat and the bolt 12 will similarly join the sections 4 and 5 to form the back of the other seat. When three seats are required, the bolt 11 is slid to the right and the bolt 12 to the left. Sections 3 and 4 will thus be joined together by both bolts to form the back of the centre seat, sections 2 and 5 forming the backs of the two outer seats. At each end of their travel the bolts are locked by a rotary movement, just as in the case of an ordinary household bolt. Access to the bolt handles is obtained by unclipping the top of the appropriate cushion and pulling it forwards, as shown in FIGURE 2.

Figure 4:
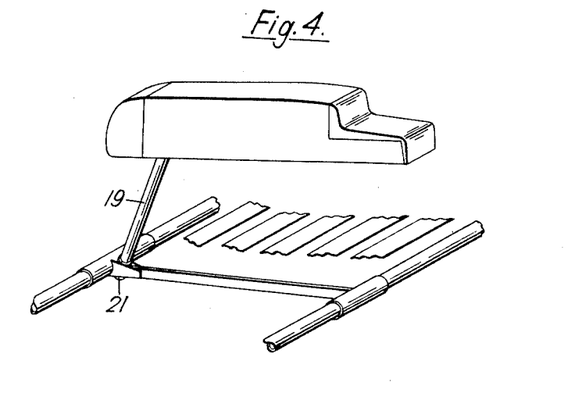
FIGURE 4 is a view of one of the centre arms.

Referring to FIGURE 1, two movable centre arms 8 and 9 are located as shown by the full lines in the two-seat position and as shown by the dotted lines in the three-seat position. In the former position, the gap between the arms 8 and 9 is bridged by a removable table 18. The construction of the centre arms is shown in detail in FIGURES 4 and 5. As shown, each arm is a simple cantilever supported at its rear end by a tubular strut. These struts, 19 in one arm and 20 in the other, fit into sockets 21 and 22 attached to the framework of the seat and when the arms are in position the struts pass through the gap between the base of the back cushions and the rear of the squab. There are, of course, four sockets in all to allow for both the two-seat and three-seat conversions. The arms are removed and replaced by a straightforward vertical movement and each arm is retained in position by a locking plate 23 and pin 24.

Figure 5:
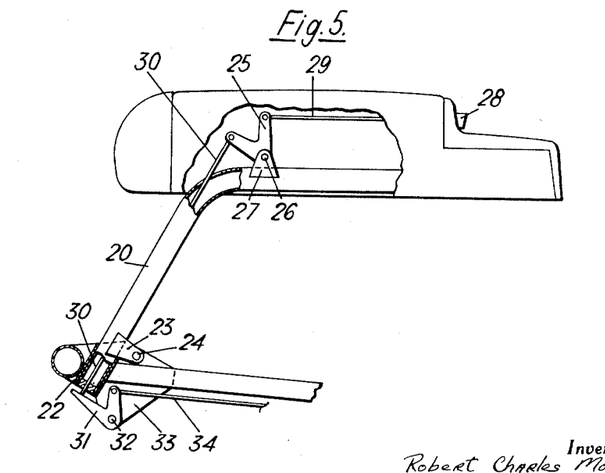
FIGURE 5 is a view of the other centre arm.

The seats in either conversion are reclining, the recline mechanisms including hydraulic jacks 68. The push buttons and control mechanisms for the hydraulic jacks are incorporated in the two end arms and also, in the three-seat conversion, in one of the centre arms. This latter mechanism is shown in FIGURE 5 and comprises a bell-crank 25 located within the centre arm and pivoted at 26 to a fixed bracket 27. One arm of the bell-crank is connected to the push button 28 by a rod 29 and the other arm carries a rod 30 which passes down the inside of the tubular strut 20. The lower end of the rod 30 bears against one arm of a second bell-crank 31, pivoted at 32 to a fixed bracket 33. The other arm of the bell-crank 31 is connected to a valve on the hydraulic jack by a rod 34. There is no mechanical connections between the rod 30 and the bell-crank 31 so when the arm is removed the hydraulic mechanism is automatically disconnected. When the arm is replaced in the two-seat conversion the push button 28 is, of course, inoperative and part of the table 18 is arranged so as to conceal the button.

Figure 6:
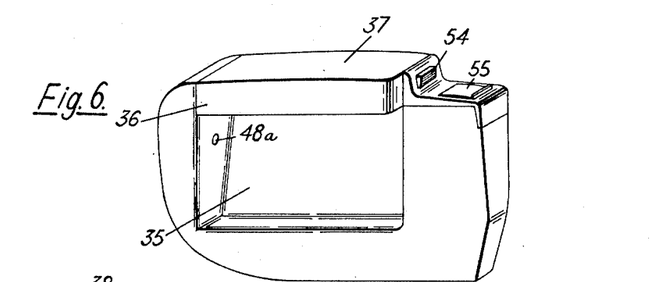
FIGURE 6 shows an end arm arranged for the two seat position.
Figures 7, 10:
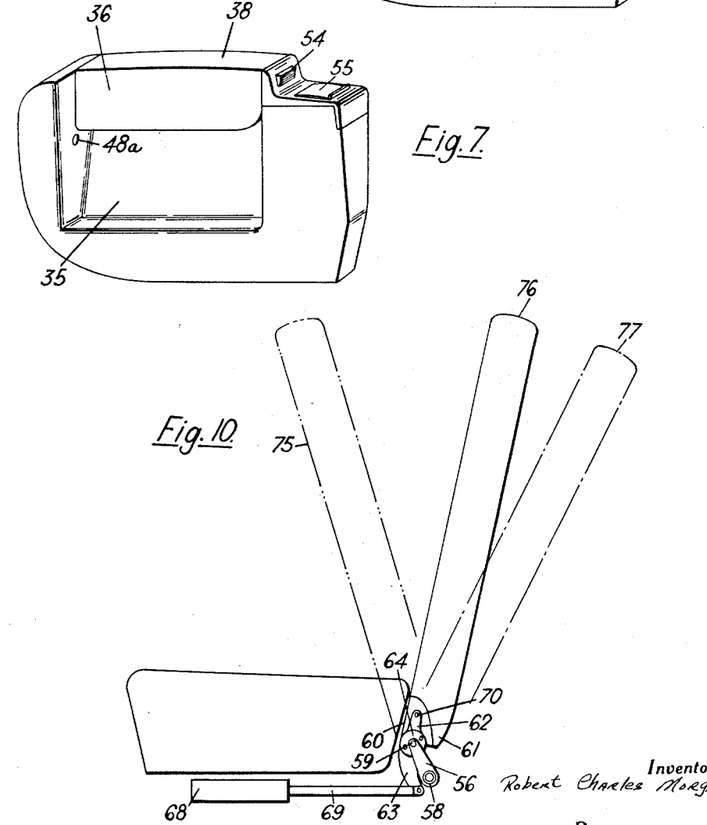
FIGURE 7 shows an end arm arranged for the three-seat position.
FIGURE 10 is a diagrammatic view showing the arrangement of a hydraulic jack and a friction disc assembly.
Figures 8, 9:
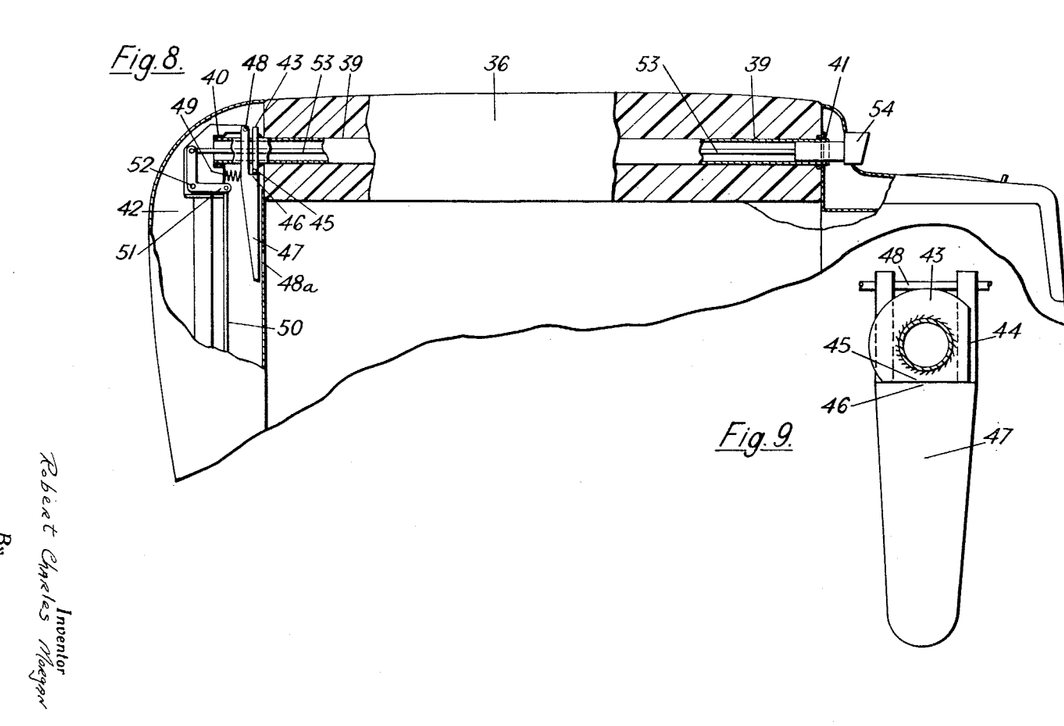
FIGURE 8 is a cross-section through an end arm showing the internal mechanism.
FIGURE 9 is an enlarged view of an end arm locking mechanism.

The two end arms are each constructed as shown in FIGURES 6, 7 and 8. The main part of the arm has a recess 35 on its inner side so as to give as much width as possible to the two outer seats in the three-seat conversion. The top of the arm 36 can be rotated through an angle of 90° and when in the two-seat position the upper surface 37 is of the same width as the main part of the arm. When three seats are required, the arm is rotated so as to bring a narrower surface 38 to the top thus increasing the effective width of the seat.

The mechanism for rotating and locking the top of the arm, together with the mechanism for operating the hydraulic jack, is shown in FIGURES 8 and 9. A hollow tube 39 passes lengthwise through the top of the arm and forms an integral part thereof. This tube is mounted in bearings 40 and 41 at each end and thus forms an axis which rotates with the top 36. Part of the rear section of the main structure of the arm is hollow, as shown at 42, and a cam 43 is mounted on the tube 39 so as to lie within this hollow. The profile of this cam is formed with two adjacent flat surfaces 44 and 45 at right-angles to each other and the cam is positioned on the tube 39 so as to ensure that when the top of the arm 36 is in either of the required positions, then one or the other of these flat surfaces is in a horizontal lower position. The flat surface which is in this position is then engaged by a co-operating flat surface 46 formed on a lever 47 which is carried on a pivot 48 at its upper end. The cam 43, the tube 39 and the top of the arm 36 are hence locked in position and cannot be rotated. In order to unlock the mechanism the lever 47 is pushed to the rear by inserting a finger through a hole 48a and the flat surface 46 is thus disengaged from the cam 43. After the top of the arm has been rotated through 90° removal of the finger pressure allows a spring 49 to return the lever 47 to the locked position.

The hydraulic jack is operated by a rod 50 the upper end of which is attached to one arm of a bell-crank 51, pivoted at 52. A second rod 53 is attached to the other end of the bell-crank and passes through the inside of the tube 39, terminating in a passenger-operated push button 54 at the front of the arm. The arm also carries an ashtray 55.

Figures 11, 12:
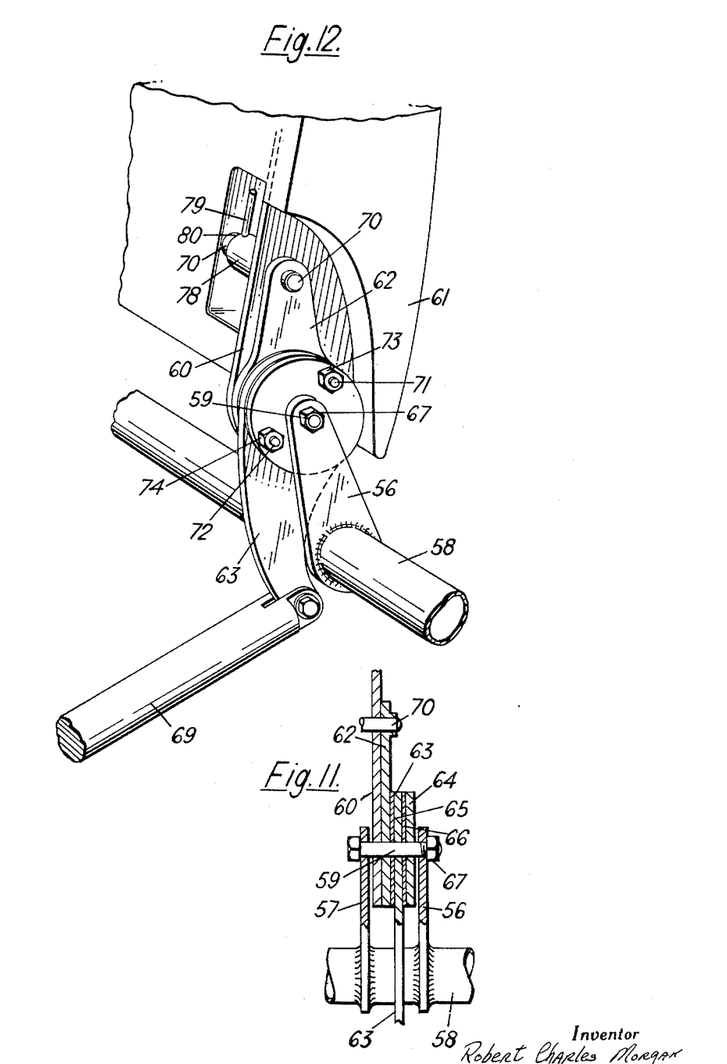
FIGURE 11 is another view of the friction disc assembly.
FIGURE 12 is a perspective view of the reclining back linkage.

FIGURES 10, 11 and 12 give a diagrammatic view of the reclining mechanism, the friction disc assembly and the associated linkage, in respect of one seat. Brackets 56 and 57 are welded or brazed to a tube 58, this tube forming the lower rear transverse member of the seat framework. A bolt 59 passes through holes drilled in the upper ends of these brackets and also through a hole drilled in the lower end of a rib 60 which is rigidly attached to the seat back section 61. The back section thus pivots on the bolt 59. This bolt also carries two links 62 and 63, an outer friction plate 64 and two friction discs 65 and 66, the assembly of these components being shown in FIGURE 11. The mechanism is held together by a nut 67 on the end of the bolt 59. This nut is not screwed up tight so that all the parts can rotate freely on the bolt 59. The hydraulic jack 68 is positioned underneath the seat and is connected to the lower end of the link 63 by means of a rod 69. A pin 70 attaches the upper end of the link 62 to the rib 60. The lower end of the link 62 carries two studs which pass through the friction discs 65 and 66, through the link 63 and also through the outer friction plate 64, the outer ends of the studs being shown at 71 and 72. For convenience the studs are not shown in FIGURE 11. These studs pass through curved slots formed in the upper end of the link 63 so that motion can only be transmitted from the link 63 to the link 62, i.e. from the jack to the seat back, by means of friction in the assembly. This friction can be adjusted by the degree of tightening given to two nuts 73 and 74 mounted on the ends of the studs 71 and 72 and bearing against the outer friction plate 64. The adjustment is such that the friction disc assembly will "break" under a prescribed impact loading, thus allowing the seat back section to rotate forwards through an angle of approximately 30°, to the position shown at 75 in FIGURE 10. In this figure the full lines 76 show the seat back section in the position of minimum recline and the dotted lines 77 show the position of maximum recline. The angular difference between these positions is approximately 15°.

When the centre seat arms are located in the two-seat position the control linkage for the centre hydraulic jack is automatically disconnected, as described above, but the main linkage through the friction disc assembly is, of course, unaffected. This means that the back of one of the two seats would be controlled by two friction disc assemblies and the breaking load would thus be twice the prescribed figure. Hence it is necessary to disconnect the central assembly when converting from three seats to two and this is done by interposing a quick-action locking mechanism between the back section 61 and the link 62.

This mechanism comprises a housing 78 attached to the rib 60 and containing the pin 70 which passes through both the rib 60 and the link 62, thus securing the link to the back section 61. The pin is free to move in an axial direction and is controlled by an operating lever 79. On moving the lever 79 so as to rotate the pin, a suitable arrangement of slots or an inclined plane formed on the end 80 of the housing 78 results in the pin 70 being withdrawn axially until it is clear of the link 62. This link, and hence the friction disc assembly and the hydraulic jack, are thus disconnected from the seat back section 61. The back section is now free to move forwards under impact loading, apart, of course, from the control exercised by the other linkage at the outer end of the back section. When the conversion is being effected, access to the lever 79 is obtained by unclipping the appropriate cushion section in the same way as described above for obtaining access to the bolts.

Figure 13:
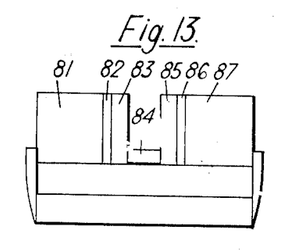
FIGURE 13 shows an alternative arrangement of the invention in the two-seat conversion.
Figure 14:
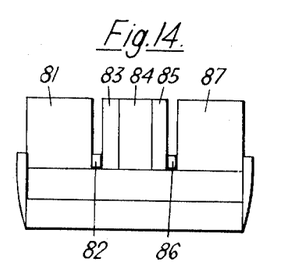
FIGURE 14 shows the arrangement of FIGURE 13 in the three-seat conversion.

Another construction according to the invention is shown in FIGURES 13 and 14, in which the seat back is composed of seven separate sections, numbered from 81 to 87 inclusive. Three of these sections, 82, 84 and 86 can be pulled downwards to form centre arms as required. FIGURE 13 shows the two-seat conversion in which section 84 is used as the centre arm. The backs of the seats are formed by bolting together sections 81, 82 and 83 to form one back and similarly bolting together sections 85, 86 and 87 to form the other back. When three seats are required, as shown in FIGURE 14, section 84 is pushed upwards and sections 82 and 86 are pulled downwards to form arms. Sections 81 and 87 now form the backs of the two outer seats and sections 83, 84 and 85 are bolted together to form the back of the centre seat.

Figures 15, 16, 17, 18, 19:
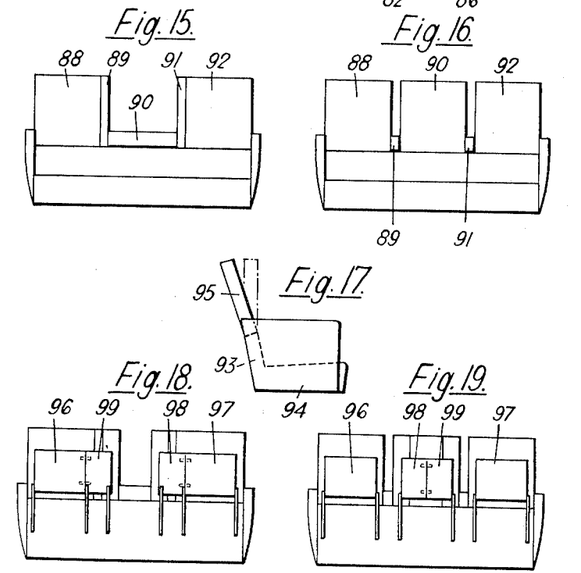
FIGURE 15 shows a third arrangement of the invention in the two-seat conversion.
FIGURE 16 shows the arrangement of FIGURE 15 in the three-seat conversion.
FIGURE 17 is an end view of an arrangement in which part of the seat back is attached to the squab.
FIGURE 18 shows one arrangement of the tables in the two-seat conversion.
FIGURE 19 shows the arrangement of FIGURE 18 in the three-seat conversion.

Still another construction is shown in FIGURES 15 and 16. In this case the seat back is composed of five separate sections, numbered from 88 to 92 inclusive, numbers 89, 90 and 91 being convertible to centre arms. In the two-seat conversion, shown in FIGURE 15, section 90 is pulled downwards to form the centre arm and the two backs are formed by bolting together sections 88 and 89 to form one back and by similarly bolting together sections 91 and 92. FIGURE 16 shows the three-seat conversion in which sections 89 and 91 form the centre arms whilst sections 88, 90 and 92 form the three backs.

In both the latter arrangements the system of bolting the appropriate back sections together is substantially as described above. It is often convenient to have a short section of the back 93 rigidly fixed to the squab 94, as shown in FIGURE 17. In this case the movable back sections 95 are pivoted to the top of the fixed section 87.

Tables are conventionally hinged to the back of the seat in front, and in the invention it is necessary to rearrange the tables on the conversion from one seat arrangement to the other. Two convenient means of effecting the conversion are shown in FIGURES 18 and 19 and in FIGURES 20 and 21. In the first of these arrangements, considering the three-seat conversion, the two outer seats have tables 96 and 97, each made in one piece, whilst the central seat has a table made in two pieces 98 and 99. In the two-seat conversion, the pieces 98 and 99 are removed and attached by suitable pegs and sockets to the tables 96 and 97, thus providing two larger tables. In order to keep the table legs in the correct position, the two centre pieces must be crossed over when making the conversion, i.e. the right-hand piece 99 is attached to the left-hand table 96 and similarly the piece 98 is attached to the table 97.

Figure 20:
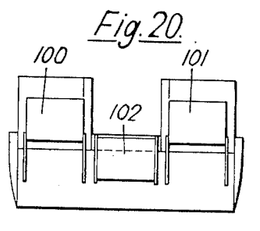
FIGURE 20 shows an alternative arrangement of the tables in the two-seat conversion.
Figure 21:
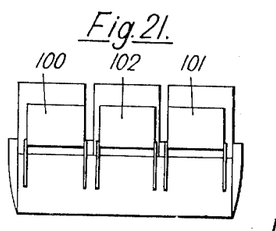
FIGURE 21 shows the arrangement of FIGURE 20 in the three-seat conversion.

The alternative arrangement, shown in FIGURES 20 and 21, is suitable for use with the method of seat conversion shown in FIGURES 15 and 16. Tables 100 and 101 are used without alteration, either for the two seats in the case of the two-seat conversion or for the two outer seats in the case of the three-seat conversion. A centre table 102 is simply folded down when only two seats are being used and the centre back section then operates as a combined arm rest and occasional table.

Further modifications may be made. For instance, in the case of the conversion from one seat to two, the centre arm may be dispensed with altogether when two seats are being used. Similarly, the two centre arms may be dispensed with when two seats are converted to three.

I claim:

1. A reclining seat for airplanes adapted to form at least one wider individual seat and at least two narrower individual seats, comprising a chair frame, a single bench-type squab on said frame, a plurality of independent seat back sections with at least one section having a width different from that of an adjacent section, means mounting each section for independent reclining movement about a horizontal axis on said frame, interlocking means for joining adjacent sections into combined seat back sections so that all the sections in the combined section move together, each combined section being movable independently of another combined section, said combined sections being equal in number to the number of individual seats in use, and said interlocking means being unlockable from said adjacent combined sections when required to allow said adjacent sections to move independently of one another.

2. A seat according to claim 1, said sections comprising two outer independently moving back sections and two inner and narrower independently moving back sections, and said interlocking means being adapted to lock said two inner sections together so as to form a central combined section when three individual seats are required and being also adapted to free said two inner sections from one another and to lock each of said outer sections to its adjacent inner section when only two wider individual seats are required.

3. A seat according to claim 2, said interlocking means comprising two parallel transverse bolts, one of said bolts being attached to one of said inner sections and the other of said bolts being attached to the other of said inner sections, said bolts being slidable so that in a first position both bolts lock said inner sections together and in a second position one bolt locks one of said outer sections to its adjacent inner section and the other bolt locks the other of said outer sections to its adjacent inner section, said inner sections then being freed from one another.

4. A seat according to claim 1 further comprising hydraulically actuated jack means controlled by passenger-operated push buttons for the independent reclining movement of said seat back sections.

5. A seat according to claim 4, further comprising a removable center arm for said seat, and at least part of the control means for one of the reclining mechanisms being housed in said center arm so that the removal of said center arm results in the disconnection of that hydraulically actuated jack means which operates said reclining mechanism.

6. A seat according to claim 1 further comprising a plurality of reclining mechanisms, power means for operating each reclining mechanism, a plurality of friction disc assemblies adapted to slip on the application of a predetermined impact loading incorporated between each of said power means and the back section operated by that means, at least one of said power means and its associated friction disc assemblies being connected to the back section operated thereby and a quick-acting locking mechanism attached to each disc assembly, whereby the power means and disc assembly can be rapidly detached from the back section.

7. A seat according to claim 1 having two fixed end arms, the top of the end arms being rotatable into either of two positions in accordance with the appropriate seating arrangement, and a finger operated catch in each arm for locking the top of the end arm in the selected position.

8. A seat according to claim 1 further comprising a plurality of tables, each attached to a seat back, at least one of said tables being in sections and said sections being adapted to be connected to other tables on conversion from a narrower to a wider seat arrangement.

References Cited in the file of this patent

UNITED STATES PATENTS

| | | |
|---|---|---|
| 1,315,031 | Munro | Sept. 2, 1919 |
| 1,802,620 | Scully | Apr. 28, 1931 |
| 1,898,448 | Hultgren | Feb. 21, 1933 |
| 2,213,633 | Kern | Sept. 3, 1940 |
| 2,579,305 | Cushman | Dec. 18, 1951 |
| 2,716,775 | Kenimer | Sept. 6, 1955 |
| 2,904,101 | Stephens | Sept. 15, 1959 |
| 2,959,207 | Brewster | Nov. 8, 1960 |
| 3,024,067 | Brandoli | Mar. 6, 1962 |
| 3,028,198 | Murr | Apr. 3, 1962 |

FOREIGN PATENTS

| | | |
|---|---|---|
| 578,982 | Great Britain | Nov. 18, 1944 |
| 882,945 | Great Britain | Nov. 22, 1961 |
| 1,218,298 | France | Dec. 14, 1959 |